United States Patent Office 3,420,683
Patented Jan. 7, 1969

3,420,683
LOW MELTING GLASS
Koichi Ikeda, Shigeru Tsuji, Shinzo Anazawa, and Tsukasa Koyama, Minatoku, Tokyo, Japan, assignors to Nippon Electric Company Limited, Minatoku, Tokyo, Japan
No Drawing. Filed Dec. 11, 1963, Ser. No. 329,854
Claims priority, application Japan, Dec. 17, 1962, 37/57,288
U.S. Cl. 106—47    7 Claims
Int. Cl. C03c 3/12; C03c 5/00

ABSTRACT OF THE DISCLOSURE

A glass composition of the PbO—$B_2O_3$ system in which the softening temperature is lowered by the addition of $Tl_2O$ in the range of from 1 to 65% by weight.

---

The instant invention relates to glass compositions and more particularly to a novel glass composition having a melting point substantially lower than glass compositions presently known in the art and having extremely advantageous characteristics for use as a frit, soldering material, electrical insulating material, lubricating material and especially as a hermetic seal for semiconductor elements.

In the field concerned with the hermetic sealing of solid-state devices, such as semiconductor elements, glass finds widespread use as the substance employed for the hermetic sealing; however, the glass compositions presently available having conventional melting points were found to be unsatisfactory and it has therefore become quite important to find a material which can be used as an adequate hermetic seal and which overcomes the disadvantages of conventionally known glass compositions.

A primary object of the present invention is that of providing the glass in which the softening temperature is lowered substantially. The softening temperature is defined as the temperature in which the viscosity of the glass becomes $10^{7.6}$ poises. This is one of the most important characteristics of low melting glass which greatly enhances the scope of usage of such glass.

It is intended in the instant invention to obtain a glass composition having a low softening temperature and which has a high degree of stability.

The composition employed is that of a PbO—$B_2O_3$ system to which is added thallium oxide, $Tl_2O$, the system comprising of PbO and $B_2O_3$; PbO, $B_2O_3$ and one or more than one kind of metal oxide.

In accordance with the instant invention, thallium oxide, $Tl_2O$, in the range of 1–65% by weight is added to a PbO—$B_2O_3$ system, or a PbO—$B_2O_3$ system containing one or more than one kind of metal oxide therein.

It has been found that the above range recited is necessary for the following reasons:

If the percentage amount by weight of the $Tl_2O$ is less than 1%, it has been found that there is no substantial lowering of the softening temperature of the glass composition. Also, when the percentage amount by weight of the $Tl_2O$ to be added is above 65%, the melting operation of the glass composition becomes extremely difficult and a stable glass cannot be obtained resulting in the degradation of mechanical strength of the resistivity against weathering. It is therefore desirable to limit the percentage amount by weight of added $Tl_2O$ to the range of 1–65%.

It is therefore one object of the instant invention to provide a novel glass composition having stability at a melting point which is substantially lower than glass compositions presently available.

Another object of the instant invention is to provide a novel glass composition having an extremely high degree of stability at a melting point level substantially below those of conventional glass compositions, which novel glass composition is comprised of a thallium oxide PbO—$B_2O_3$, system or a thallium oxide PbO—$B_2O_3$ system containing one or more than one kind of metal oxide therein.

Still another object of the instant invention is to provide a novel glass composition having extreme stability at a melting point substantially lower than the conventional glass composition, which novel glass composition is comprised of a thallium oxide PbO—$B_2O_3$ system or a thallium oxide PbO—$B_2O_3$ system containing one or more than one kind of metal oxide therein, in the range of 1–65% by weight of thallium oxide.

Still another object of the instant invention is to provide a low melting glass composition which is comprised of thallium oxide in the range 1–65% by weight of thallium oxide in a PbO—$B_2O_3$ system or a PbO—$B_2O_3$ system containing one or more than one kind of metal oxide therein.

These and other objections will become apparent when reading the accompanying description and tables set forth therein.

Embodiments of the instant invention are described with reference to Tables 1–10 set forth herein.

Table 1 shows the softening temperature of the glass versus the amount of $Tl_2O$ added to the PbO—$B_2O_3$ system wherein the proportion of PbO—$B_2O_3$ is varied between PbO:$B_2O_3$=8:1 and PbO:$B_2O_3$=3:2 while the percentage by weight addition of $Tl_2O$ is varied between 10 and 60%. Table 1 shows the effect on the softening temperature of the glass of various proportions of $Tl_2O$ added to the PbO—$B_2O_3$.

TABLE 1

| PbO | $B_2O_3$ | $Tl_2O$ | Softening Temperature (° C.) |
|---|---|---|---|
| 80 | 10 | 10 | 298.7 |
| 70 | 10 | 20 | 277.4 |
| 60 | 10 | 30 | 267.0 |
| 50 | 10 | 40 | 253.7 |
| 40 | 10 | 50 | 252.4 |
| 30 | 10 | 60 | 242.1 |
| 75 | 15 | 10 | 311.3 |
| 65 | 15 | 20 | 302.1 |
| 55 | 15 | 30 | 287.8 |
| 45 | 15 | 40 | 273.3 |
| 35 | 15 | 50 | 269.2 |
| 25 | 15 | 60 | 251.1 |
| 70 | 20 | 10 | 387.4 |
| 60 | 20 | 20 | 379.5 |
| 50 | 20 | 30 | 366.9 |
| 40 | 20 | 40 | 359.0 |
| 30 | 20 | 50 | 377.1 |

Table 2 shows the softening temperature of the glass versus the amount of $Tl_2O$ added to the PbO—$B_2O_3$ system wherein the proportion of the PbO—$B_2O_3$ is held constant throughout while the percentage by weight of $Tl_2O$ is varied between 0 and 65%. Table 1 clearly shows the contrast of the softening temperatures obtained through the addition of $Tl_2O$ against the case where no $Tl_2O$ is added to the $PbO$—$B_2O_3$ system.

TABLE 2

| Percent | | | Softening temperature (° C.) |
|---|---|---|---|
| PbO | $B_2O_3$ | $Tl_2O$ | |
| 87.5 | 12.5 | 0 | 329.2 |
| 84.9 | 12.1 | 3 | 324.3 |
| 82.25 | 11.75 | 6 | 322.7 |
| 79.6 | 11.4 | 9 | 317.7 |
| 77.0 | 11.0 | 12 | 300.9 |
| 74.4 | 10.6 | 15 | 296.2 |
| 70.0 | 10.0 | 20 | 277.4 |
| 65.6 | 9.4 | 25 | 271.9 |
| 61.25 | 8.75 | 30 | 265.0 |
| 52.5 | 7.5 | 40 | 257.5 |
| 43.75 | 6.25 | 50 | 241.4 |
| 35.0 | 5.0 | 60 | 230.0 |
| 30.63 | 4.37 | 65 | 224.0 |

In the case where the $Tl_2O$ percentage is zero, the softening temperature in ° C. is 329.2. By an addition of only 3% by weight of $Tl_2O$, the softening temperature is lowered to 324.3° C. The softening temperature has been found to be lowered to 224.0° C. by an addition of 65% by weight of $Tl_2O$, which can be seen to be over 31% lower in temperature than the $PbO$—$B_2O_3$ system with 0% $Tl_2O$ added. Observation of Table 2 further shows as the percentage amount by weight of $Tl_2O$ is increased from 0–65%, the softening temperature in degree centigrade is also proportionally decreased.

Table 3 shows the softening temperature of the glass versus the composition of $PbO$—$B_2O_3$—$Bi_2O_3$—$Tl_2O$ wherein the amount and proportion of the $B_2O_3$ and $Bi_2O_3$ components are held constant.

TABLE 3

| Percent | | | | Softening temperature (° C.) |
|---|---|---|---|---|
| PbO | $B_2O_3$ | $Bi_2O_3$ | $Tl_2O$ | |
| 80 | 5 | 15 | 0 | 299.4 |
| 77 | 5 | 15 | 3 | 292.4 |
| 74 | 5 | 15 | 6 | 290.5 |
| 71 | 5 | 15 | 9 | 283.5 |

By contrast the percentage additions of $Tl_2O$ are given against 0% of $Tl_2O$. With no $Tl_2O$ added, the softening temperature is 299.4° C. and with the addition of $Tl_2O$ the softening temperature can be lowered to as low as 283.5° C. with an addition of only 9% by weight of $Tl_2O$. Thus, it can clearly be seen that the softening temperature is lowered as the percentage content by weight of $Tl_2O$ is increased.

Table 4 shows a tabulation of the softening temperature versus the amount of $Tl_2O$ added to a $PbO$—$B_2O_3$—$Bi_2O_3$ system in which the proportion of the $PbO:B_2O_3:Bi_2O_3$ is held constant.

TABLE 4

| Percent | | | | Softening temperature (° C.) |
|---|---|---|---|---|
| PbO | $B_2O_3$ | $Bi_2O_3$ | $Tl_2O$ | |
| 82.25 | 11.75 | 6 | 0 | 331.4 |
| 79.8 | 11.5 | 5.8 | 3 | 324.8 |
| 77.3 | 11.0 | 5.7 | 6 | 321.4 |
| 74.8 | 10.7 | 5.5 | 9 | 311.7 |

Table 4 also shows that the softening temperature decreases as the percentage content of $Tl_2O$ is increased.

Table 5 shows the softening temperature of the glass composition versus the amount of $Tl_2O$ added to a $$PbO—B_2O_3—Al_2O_3$$

system wherein the proportion of the $PbO:B_2O_3:Al_2O_3$ is held constant.

TABLE 5

| Percent | | | | Softening temperature (° C.) |
|---|---|---|---|---|
| PbO | $B_2O_3$ | $Al_2O_3$ | $Tl_2O$ | |
| 85 | 7.5 | 7.5 | 0 | 376.0 |
| 82.4 | 7.3 | 7.3 | 3 | 371.0 |
| 79.8 | 7.1 | 7.1 | 6 | 374.3 |

In contrast with the glass with 0% by weight of $Tl_2O$, lowering of the softening temperature is observed in the glass in which $Tl_2O$ is added.

Table 6 shows the softening temperature of the glass versus the amount of $Tl_2O$ added to a $PbO$—$B_2O_3$—$SiO_2$ system where the proportion of the $PbO:B_2O_3:SiO_2$ is held constant.

TABLE 6

| Percent | | | | Softening temperature (° C.) |
|---|---|---|---|---|
| PbO | $B_2O_3$ | $SiO_2$ | $Tl_2O$ | |
| 85 | 7.5 | 7.5 | 0 | 371.0 |
| 79.8 | 7.1 | 7.1 | 6 | 348.9 |
| 77.34 | 6.83 | 6.83 | 9 | 356.8 |
| 74.8 | 6.6 | 6.6 | 12 | 334.3 |
| 72.2 | 6.4 | 6.4 | 15 | 320.8 |

By the addition of $Tl_2O$, the softening temperature of the glass is lowered distinctly in contrast with the glass having 0% $Tl_2O$.

Table 7 shows the softening temperature of the glass versus the amount of $Tl_2O$ added to a $PbO$—$B_2O_3$—$GeO_2$ system where the proportion of the $PbO:B_2O_3:GeO_2$ is constant.

TABLE 7

| Percent | | | | Softening temperature (° C.) |
|---|---|---|---|---|
| PbO | $B_2O_3$ | $GeO_2$ | $Tl_2O$ | |
| 80.4 | 10.7 | 12.5 | 0 | 364 |
| 72.2 | 9.4 | 11.4 | 9 | 358.4 |
| 68.3 | 9.1 | 10.6 | 15 | 339.2 |

In the above case, the softening temperature is again lowered with increase of the constant of $Tl_2O$.

Table 8 shows the softening temperature of the glass with the amount of $Tl_2O$ added to a $PbO$—$B_2O_3$—$CdO$ system where the proportion of the $PbO:B_2O_3:CdO$ is constant.

TABLE 8

| Percent | | | | Softening temperature (° C.) |
|---|---|---|---|---|
| PbO | $B_2O_3$ | CDO | $Tl_2O$ | |
| 80 | 10 | 10 | 0 | 354.2 |
| 77.6 | 9.7 | 9.7 | 3 | 336.2 |
| 75.2 | 9.4 | 9.4 | 6 | 326.5 |
| 70.4 | 8.8 | 8.8 | 12 | 313.8 |

In the above case, too, the softening temperature is lowered with increase of the content of $Tl_2O$.

Table 9 shows the softening temperatures of the glass versus the amount of $Tl_2O$ added to a $PbO$—$B_2O_3$—$TeO_2$ system where the proportion of the $PbO:B_2O_3:TeO_2$ is constant.

TABLE 9

| Percent | | | | Softening temperature (° C.) |
|---|---|---|---|---|
| PbO | $B_2O_3$ | $TeO_2$ | $Tl_2O$ | |
| 82.5 | 12.5 | 5 | 0 | 352.7 |
| 80.0 | 12.1 | 4.9 | 3 | 342.3 |
| 77.5 | 11.85 | 4.7 | 6 | 321.8 |
| 75.1 | 11.35 | 4.55 | 9 | 318.5 |
| 72.1 | 11.0 | 4.15 | 12 | 309.0 |
| 70.2 | 10.0 | 4.3 | 15 | 299.2 |
| 66.0 | 10.0 | 4.0 | 20 | 286.9 |
| 61.8 | 9.35 | 3.75 | 25 | 274.6 |
| 57.7 | 8.75 | 3.5 | 30 | 264.0 |
| 49.5 | 7.5 | 3.0 | 40 | 259.7 |
| 33.0 | 5.0 | 2.0 | 60 | 249.6 |

In this case, also, the softening temperature is lowered with increase in percent content by weight of $Tl_2O$.

Table 10 shows the softening temperature of the glass versus the amount of Tl$_2$O added to the system in which a PbO—B$_2$O$_3$ system contains more than one kind of metal oxide where the mutually relative proportions of the components other than Tl$_2$O are constant.

TABLE 10

| | Percent | | | | | | | Softening temperature (° C.) |
|---|---|---|---|---|---|---|---|---|
| Tl$_2$O | PbO | B$_2$O$_3$ | SiO$_2$ | Al$_2$O$_3$ | ZnO | Bi$_2$O$_3$ | TeO$_2$ | |
| 0 | 75 | 11 | 3 | 11 | | | | 440.0 |
| 9 | 68.3 | 10 | 2.7 | 10 | | | | 411.5 |
| 0 | 70.0 | 11 | 3.0 | 11 | | | 5 | 441.2 |
| 9 | 63.7 | 10 | 2.7 | 10 | | | 4.6 | 412.1 |
| 0 | 80.0 | 10 | | | 5 | 5 | | 334.5 |
| 6 | 75.2 | 9.6 | | | 4.6 | 4.6 | | 321.8 |
| 0 | 80.0 | 10 | | | 5.0 | | 5 | 346.0 |
| 6 | 75.2 | 9.6 | | | 4.6 | | 4.6 | 322.7 |
| 0 | 77.0 | 8.0 | | | 10 | | 5.0 | 339.6 |
| 6 | 72.3 | 7.5 | | | 9.6 | | 4.6 | 331.9 |
| 0 | 67.0 | 14.0 | | 2 | 15 | | | 412.0 |
| 6 | 62.9 | 13.15 | | 1.88 | 14.1 | | | 400.8 |

The above table exhibits the same results as those of the preceding Tables 1 through 10.

As is clear from the embodiments of this invention shown in Table 1 to 10 the softening temperatures of the glass obtained by the addition of Tl$_2$O are lower than the glass without Tl$_2$O. That is, by the addition of Tl$_2$O to PbO—B$_2$O$_3$ or a PbO—B$_2$O$_3$ system in which one or more than one kind of metal oxides are contained in PbO—B$_2$O$_3$ it is possible to lower the softening temperatures of the glass and to provide the glass having the superior stability.

Although there have been described preferred embodiment of this novel invention, many variations and modifications will now be apparent to those skilled in the art. Therefore, this invention is to be limited, not by the specific disclosure herein, but only by the appending claims.

What is claimed is:
1. A composition for glass having a low melting point comprising PbO, B$_2$O$_3$ and Tl$_2$O; the percent amount by weight of Tl$_2$O being in the range of 1%–65%; said PbO and B$_2$O$_3$ being contained in the ratio of approximately 7:1 by weight.

2. A composition for glass having a low melting point comprising PbO, B$_2$O$_3$, Bi$_2$O$_3$ and Tl$_2$O; the percent amount by weight of Tl$_2$O being in the range of 1%–65%; PbO, B$_2$O$_3$ and Bi$_2$O$_3$ being contained in the ratio of approximately 41:6:3 by weight.

3. A composition for glass having a low melting point comprising PbO, B$_2$O$_3$, Al$_2$O$_3$ and Tl$_2$O; the percent amount by weight of Tl$_2$O being in the range of 1% to 65%; the proportions by weight of PbO, B$_2$O$_3$ and Al$_2$O$_3$ being constant throughout the range of Tl$_2$O added; said PbO, B$_2$O$_3$ and Al$_2$O$_3$ being contained in the ratio of approximately 34:3:3 by weight.

4. A composition for glass having a low melting point comprising PbO, B$_2$O$_3$, SiO$_2$ and Tl$_2$O; the percent amount by weight of Tl$_2$O being in the range of 1% to 65%; said PbO, B$_2$O$_3$ and SiO$_2$ being contained in the ratio of approximately 11.25:1:1 by weight.

5. A composition for glass having a low melting point comprising PbO, B$_2$O$_3$, GeO$_2$ and Tl$_2$O; the percent amount by weight of Tl$_2$O being in the range of 1% to 65%; the proportions by weight of PbO, B$_2$O$_3$ and GeO$_2$ being constant throughout the range of Tl$_2$O added; said PbO, B$_2$O$_3$ and GeO$_2$ being contained in the ratio of approximately 7.6:1:1:1.175 by weight.

6. A composition for glass having a low melting point comprising PbO, B$_2$O$_3$, CdO and Tl$_2$O; the percent amount by weight of Tl$_2$O being in the range of 1% to 65%; the proportions by weight of PbO, B$_2$O$_3$ and CdO being constant throughout the range of the Tl$_2$O added; said PbO, B$_2$O$_3$ and CdO being contained in the ratio of 8:1:1 by weight.

7. A composition for glass having a low melting point comprising PbO, B$_2$O$_3$, TeO$_2$ and Tl$_2$O; the percent amount by weight of Tl$_2$O being in the range of 1% to 65%; the proportions by weight of PbO, B$_2$O$_3$ and TeO$_2$ being constant throughout the range of Tl$_2$O added; said PbO, B$_2$O$_3$ and TeO$_2$ being contained in the ratio of approximately 16.5:2.5:1 by weight.

References Cited

UNITED STATES PATENTS

| 3,238,151 | 3/1966 | Kim _____ | 252—518 |
| 3,211,826 | 10/1965 | Holcomb et al. _____ | 106—49 |
| 2,853,393 | 9/1958 | Beck et al. _____ | 106—47 |

OTHER REFERENCES

Fajans et al.: Stability of Lead Glasses and Polarization of Ions, J. Am. Cer. Soc., vol. 31 (1948) (pp. 113–114 relied on).

HELEN M. McCARTHY, *Primary Examiner.*

U.S. Cl. X.R.

106—53, 54, 49